(12) United States Patent
Mukou

(10) Patent No.: US 8,979,151 B2
(45) Date of Patent: Mar. 17, 2015

(54) ROBOT HAND FOR HANDLING WORKPIECE IN HIGH TEMPERATURE AREA

(71) Applicant: Fanuc Corporation, Minamitsuru-gun, Yamanashi (JP)

(72) Inventor: Hiroshi Mukou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/072,256

(22) Filed: Nov. 5, 2013

(65) Prior Publication Data

US 2014/0125079 A1    May 8, 2014

(30) Foreign Application Priority Data

Nov. 7, 2012  (JP) ................................. 2012-245409

(51) Int. Cl.
| | | |
|---|---|---|
| B66C 1/00 | (2006.01) | |
| B66C 1/42 | (2006.01) | |
| B25J 15/02 | (2006.01) | |

(52) U.S. Cl.
CPC ............ *B25J 15/0206* (2013.01); *Y10S 901/32* (2013.01)
USPC .............................. 294/106; 294/213; 901/32

(58) Field of Classification Search
USPC ............. 294/86.4, 213, 106, 902, 198, 87.22; 901/30–32, 39
See application file for complete search history.

(56) References Cited

U.S. PATENT DOCUMENTS

| | | | | |
|---|---|---|---|---|
| 5,092,731 A | * | 3/1992 | Jones et al. .................... | 414/406 |
| 7,168,748 B2 | * | 1/2007 | Townsend et al. ............ | 294/106 |
| 7,445,260 B2 | * | 11/2008 | Nihei et al. ..................... | 294/106 |
| 7,654,595 B2 | * | 2/2010 | Yokoyama et al. ........... | 294/99.1 |
| 7,837,247 B2 | * | 11/2010 | Waldorf et al. ............... | 294/116 |

FOREIGN PATENT DOCUMENTS

| | | |
|---|---|---|
| CN | 201645484(U) | 11/2010 |
| CN | 201751047(U) | 2/2011 |
| CN | 202241282(U) | 5/2012 |
| DE | 10 2005 033 733 A1 | 1/2007 |
| EP | 0 272 205 A1 | 6/1988 |
| JP | U-59-085635 | 6/1984 |
| JP | U-61-138444 | 8/1986 |
| JP | 61-216828 | 9/1986 |

(Continued)

OTHER PUBLICATIONS

German Office Action dated Sep. 2, 2014 for German Patent Appl. No. 102013018329.4.

(Continued)

*Primary Examiner* — Stephen Vu
(74) *Attorney, Agent, or Firm* — RatnerPrestia

(57) ABSTRACT

A robot hand (10) comprises an outside section that is not adapted for entry into a high-temperature area and an entry section adapted for entering the high-temperature area includes a frame (15) extending from the base unit and covering intermediate portions of the shafts; a distal end support (30) provided in the frame and adapted to support near distal end portions of the shafts; and holding units (13, 14) each attached to corresponding each of the shafts for holding a workpiece. The proximal end support is adapted to support the shafts via a bearing. The distal end support includes support holes larger than the outer diameters of the shafts such that the shafts are inserted into the support holes, respectively.

6 Claims, 6 Drawing Sheets

(56) References Cited

FOREIGN PATENT DOCUMENTS

| | | |
|---|---|---|
| JP | 10-225889 | 8/1998 |
| JP | A-2001-071290 | 3/2001 |
| JP | 2010-005732 | 1/2010 |
| JP | 2010-149224 | 7/2010 |
| JP | 2012-218084 | 11/2012 |
| SU | 1337253 A1 | 9/1987 |

OTHER PUBLICATIONS

Chinese Office Action dated Sep. 10, 2014 for Chinese Patent Appl. No. 2013105410031.

* cited by examiner

ROBOT HAND FOR HANDLING WORKPIECE IN HIGH TEMPERATURE AREA

BACKGROUND OF THE INVENTION

1. Field of the Invention

The invention relates to a robot hand. In particular, the invention relates a robot hand adapted for handling a workpiece heated to a high temperature in a high-temperature area.

2. Description of the Related Art

Conventionally, workpieces that are processed by a processing machine or machines may be held by a hand of a robot and taken out of the processing machine(s). Japanese Laid-Open Patent Publication No. 2010-005732 discloses a robot hand adapted for handling of a workpiece by opening and closing of a holding unit. Japanese Laid-Open Patent Publication No. 2010-149224 discloses another robot hand adapted for handling of a workpiece using an air-actuated adsorption unit.

Furthermore, Japanese Patent Application No. 2011-083685 discloses a servo hand featuring a double-shaft configuration in which in a first shaft with a first nail is coaxially, provided a second shaft with a second nail. The servo hand is thus adapted to change rotational positions of the first and second nails about an axis of the first and second shafts and thereby hold and release the workpiece.

A workpiece may be heated considerably as a result of being processed by specific processing machines such as press machines and forging machines. In the robot hand disclosed in Japanese Laid-Open Patent Publication No. 2010-005732, the servo motor is arranged near the holding unit. Accordingly, when the workpiece is to be taken out of the above-mentioned specific processing machine, or when the workpiece is highly heated, the servo motor is thermally affected, which may cause its lifetime to be degraded. In addition, since the air-actuated adsorption unit disclosed in Japanese Laid-Open Patent Publication No. 2010-149224 has a low heat resistance, it is difficult to use this adsorption unit in a high-temperature environment.

In Japanese Patent Application No. 2011-083685, the servo motor is allowed to be spaced away from the first and second nails at a distance defined by the lengths of the first and second shafts. Accordingly, it is possible to prevent the servo motor from being thermally affected even when the workpiece is at a high temperature.

However, in such a double-shaft configuration in the context of the servo hand described in Japanese Patent Application No. 2010-03685, a bearing provided between the first shaft and the second shaft needs to be placed at the distal end of the servo hand. Consequently, when the servo hand of Japanese Patent Application No. 2010-083685 is moved into the high-temperature area, the bearing may deteriorate due to the thermal effects within the area.

It is therefore an object of the invention, which has been made in view of the foregoing issues, to provide a robot hand capable of handling a workpiece without malfunctioning even in a high-temperature area.

SUMMARY OF THE INVENTION

In order to achieve the above-identified objective, according to a first aspect of the invention, there is provided a robot hand comprising (a) an outside section adapted for always remaining outside of a high-temperature area, and (b) an entry section adapted for entering the high-temperature area. The outside section comprises (i) a base unit attached to a front end of a robot arm, (ii) a driving unit attached to the base unit, and (iii) a proximal end support configured to support near proximal end portions of a plurality of shafts connected to the driving unit.

The entry section comprises (i) a frame extending from the base unit and covering intermediate portions of the shafts, (ii) a distal end support provided in the frame and configured to support near distal end portions of the shafts, and (iii) holding units each attached to each of the corresponding shafts and configured to hold a workpiece.

The proximal end support is configured to support the shafts via bearings. The distal end support includes a plurality of support holes each larger than the outer diameter of each of the corresponding shafts. The shafts are inserted into each of the corresponding support holes, respectively.

The workpiece is held by and released from the holding units by making the driving unit drive the shafts and thereby open and close the holding units.

According to a second aspect of the invention, there is provided a robot hand comprising (a) an outside section adapted for always remaining outside of a high-temperature area, and (b) an entry section adapted for entering the high-temperature area.

The outside section comprises (i) a base unit attached to a front end of a robot arm, (ii) a linear-motion guide unit attached to the base unit, (iii) a slide unit attached to the linear-motion guide unit, (iv) a first driving unit configured to move the slide unit linearly along the linear-motion guide unit, (v) a second driving unit attached to the slide unit, and (vi) a proximal end support configured to support near proximal end portions of a plurality of shafts connected to the second driving unit.

The entry section comprises (i) a frame extending from the base unit and covering intermediate portions of the shafts, (ii) a distal end support provided in the frame and configured to support distal end portions of the shafts, and (iii) holding units each attached to each of the corresponding shafts and configured to hold a workpiece.

The proximal end support is configured to support the shafts via bearings. The distal end support includes a plurality of support holes larger than the outer diameter of the shaft such that the shafts are each inserted into each of the corresponding support holes.

The holding units are configured to be moved forward and backward by making the first driving unit move the slide unit along the linear-motion guide unit, and configured to be driven by the second driving unit and thereby opened and closed such that the workpiece is held by and released from the holding units.

According to a third aspect of the invention, the driving unit in the first aspect is a servo motor.

According to a fourth aspect of the invention, the first driving unit and the second driving unit in the second aspect are servo motors.

According to a fifth aspect of the invention, the servo motor in the third or fourth aspect is controlled by the controller of the robot.

These and other objects, features, and advantages of the invention will be more apparent from the following detailed description of the exemplary embodiments and the accompanying drawings.

DETAILED DESCRIPTION

Exemplary embodiments of the invention will be described with reference to the accompanying drawings. In the following drawings, the same or similar reference symbols are assigned to the same or similar elements. For better understanding of the invention, the drawings are scaled as required.

Figure 1:
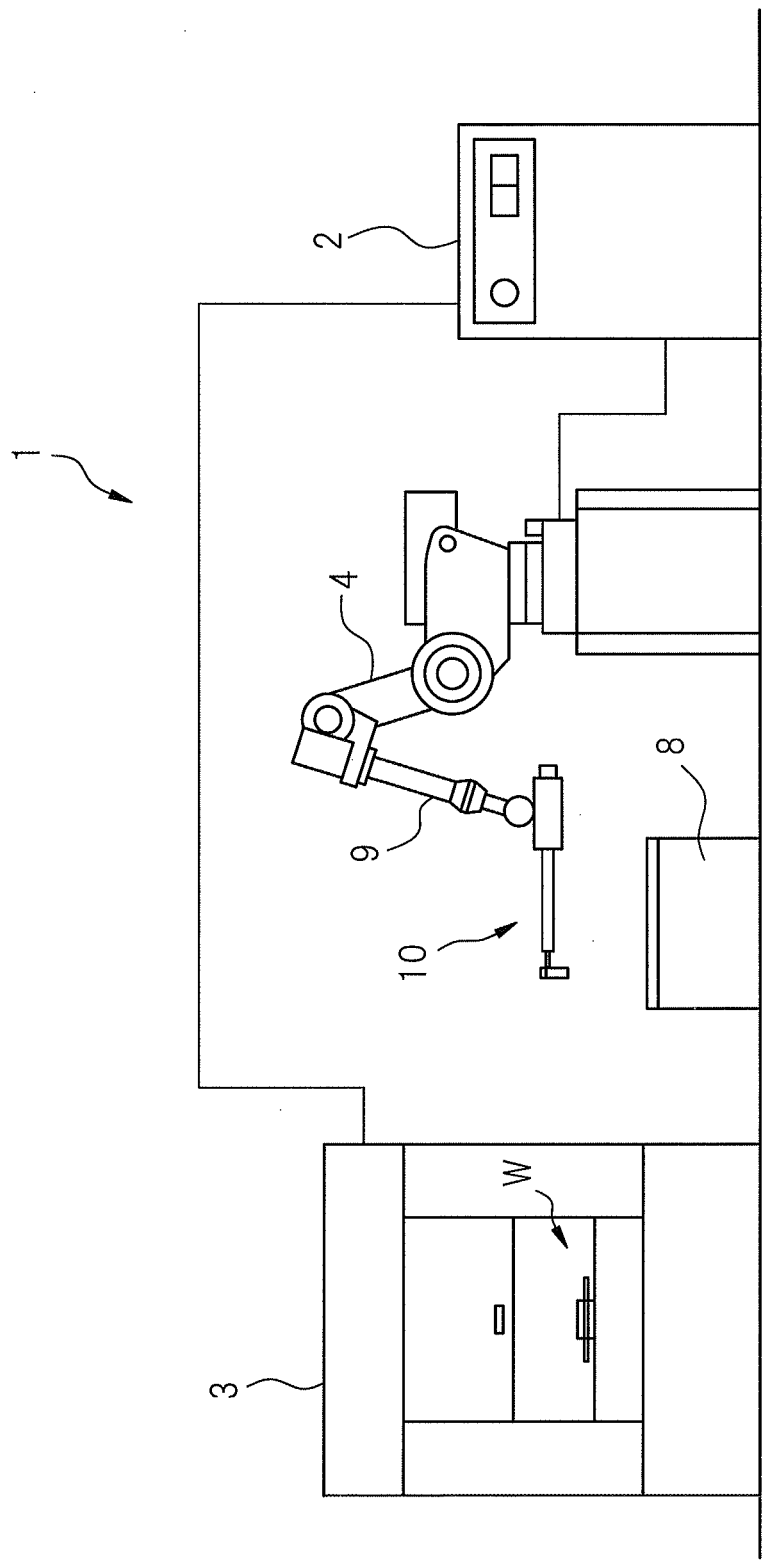
FIG. 1 is a schematic view of a system that incorporates a robot comprising a robot hand according to the invention.

FIG. 1 is a schematic view of a system that incorporates a robot comprising a robot according to the invention. The system 1 illustrated in FIG. 1 comprises the robot 4, a heating furnace 3, and a controller 2 configured to control the robot 4 and the heating furnace 3. The robot 4 may be configured, for example, as a hexaxial vertical articulated robot. It is also contemplated, however, that the robot 4 may be (chosen from) other robots with different configurations. In addition, there is provided an accommodation unit 8, near the heating furnace 3, for accommodating therein a workpiece W that has been heated by the heating furnace 3.

Figure 2:
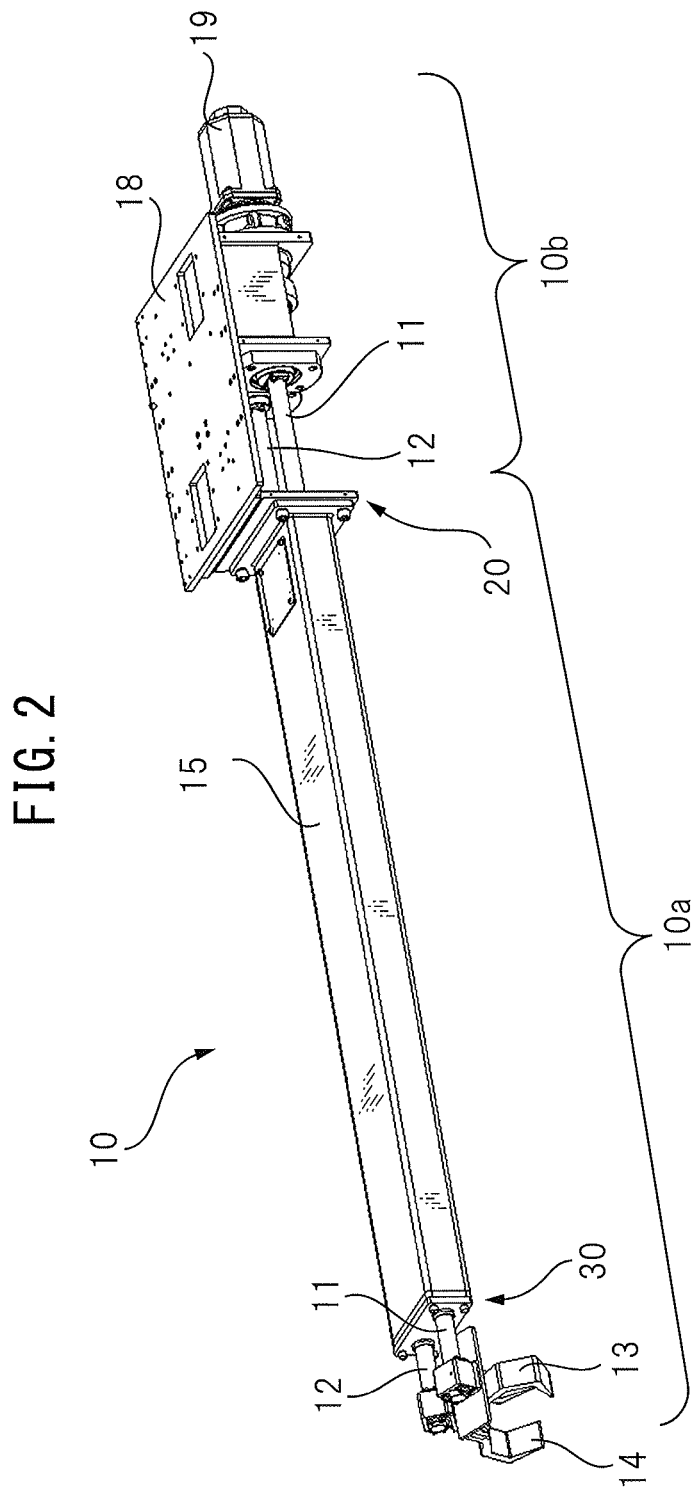
FIG. 2 is a perspective view of a robot hand according to a first embodiment of the invention.

FIG. 2 is a perspective view of a robot hand according to a first embodiment of the invention. The robot hand 10 illustrated in FIG. 2 is attached to a front end of a robot arm 9 of the robot 4 illustrated in FIG. 1.

Specifically, the robot arm 9 is connected to the upper surface of a base unit 18 of the robot hand 10. As illustrated in the figure, a servo motor 19 is provided at one end of the base unit 18. There are also provided a plurality of shafts that are parallel to each other, for example, two shafts 11, 12, whose proximal ends may be connected to the servo motor 19 via gears (not illustrated). The two shafts 11, 12 extend through a proximal end support 20, which is provided at the other end of the base unit 18, into a frame 15.

As can be seen from FIG. 2, the frame 15 extends in parallel with the shafts 11, 12 such that the shafts 11, 12 are circumferentially covered by the frame 15. Accordingly, the frame 15 play a role in protecting the shafts 11, 12 from an environment in which they reside, for example, from (being affected by) a high-temperature area. Alternatively, the frame 15 may take a different shape as long as a proximal end support 20, which will be described later, is provided.

As illustrated in the figure, the frame 15 is shorter than the shafts 11, 12. Accordingly, the distal ends of the shafts 11, 12 extend through a distal end support 30 provided at the distal end of the frame 15 and thus protrude from the frame 15. The distal end support 30 will be described later.

As illustrated in FIG. 2, there are provided holding units 13, 14 at the distal ends of the shafts 11, 12, respectively. The holding units 13, 14 extend generally perpendicularly to the shafts. The holding units 13, 14 are integrated with the shafts 11, 12. Accordingly, when the shafts 11, 12 are rotated by the servo motor 19 in mutually opposite directions, the holding units 13, 14 rotate about the shafts 11, 12, so that the holding units 13, 14 are allowed to be opened and closed and thus the workpiece W is held and released by the holding units 13, 14. The holding units 13, 14 with other configurations or other shapes may also be attached to the distal ends of the shafts 11, 12. In addition, the shafts 11, 12 with diameters different from each other may be arranged coaxially.

As can be seen from FIG. 2, the holding units 13, 14, the frame 15, and the distal end support 30 constitute a high-temperature-area-entry section 10a (hereafter simply referred to as an "entry section"). The entry section 10a is a section that may, during the operation of the robot 4, enter the high-temperature area, for example, the inside of the heating furnace 3. On the contrary, the base unit 18, the servo motor 19, and the proximal end support 20 constitute a high-temperature-area-not-entering section 10b (hereafter simply referred to as an "outside section"). The outside section 10b is the other section that does not enter the high-temperature area during the operation of the robot 4 but always remains outside of the heating furnace 3 and spaced away from the heating furnace 3 at a predetermined distance or farther.

Figure 3:
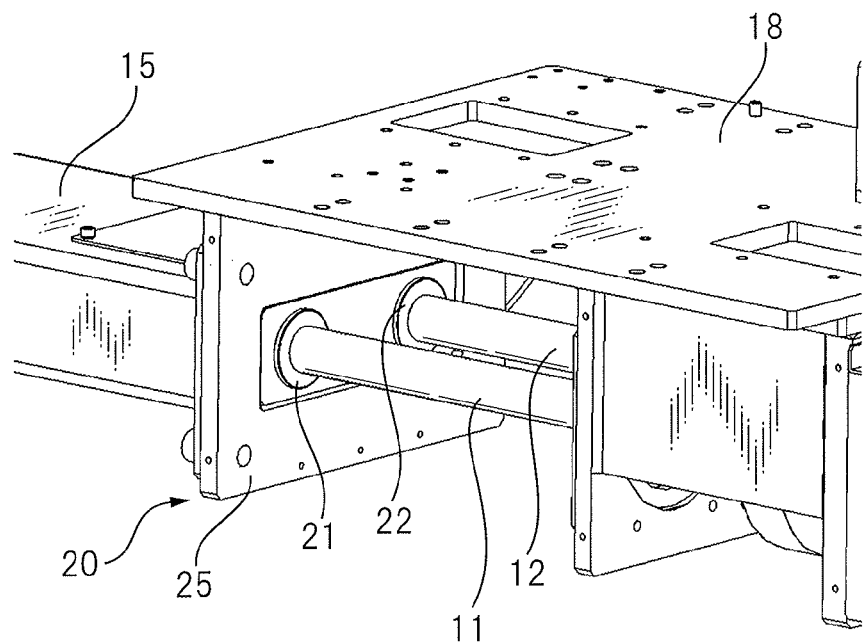
FIG. 3 is an enlarged perspective view of a base unit illustrated in FIG. 2.
Figure 4:
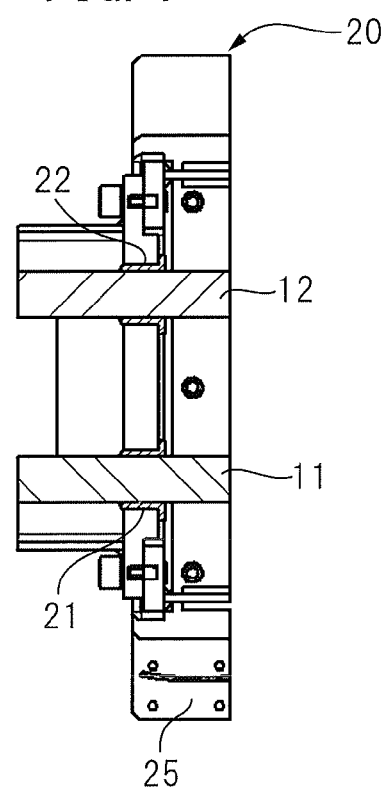
FIG. 4 is a cross-sectional view of a proximal end support illustrated in FIG. 3.

FIG. 3 is an enlarged perspective view of the base unit illustrated in FIG. 2, and FIG. 4 is a cross-sectional view of the proximal end support illustrated in FIG. 3. As illustrated in these figures, the proximal end support 20 includes an end plate 25 extending perpendicularly to the base unit 18 at the front end of the base unit 18. Throughholes are formed in the end plate 25 at locations each corresponding to the shafts 11, 12, and bearings 21, 22 are provided in the throughholes, respectively.

Accordingly, as can be seen from FIGS. 2 and 3, the shafts 11, 12 are supported by the bearings 21, 22 of the end plate 25, respectively. Thus, the shafts 11, 12 are rotatably supported, near proximal end portions thereof, in and by the bearings 21, 22, respectively.

Figure 5:
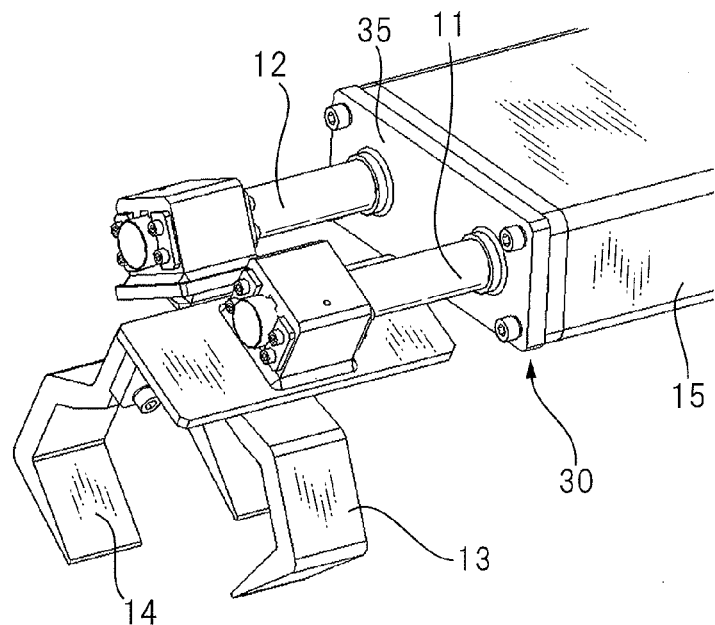
FIG. 5 is an enlarged perspective view of a holding unit illustrated in FIG. 2.
Figure 6:
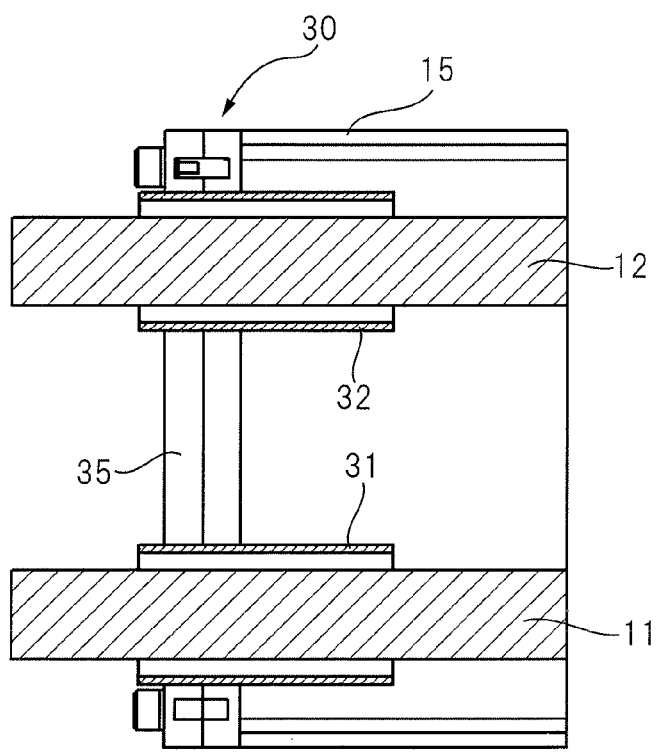
FIG. 6 is a cross-sectional view of a distal end support illustrated in FIG. 5.

FIG. 5 is an enlarged perspective view of the holding unit illustrated in FIG. 2, and FIG. 6 is a cross-sectional view of the distal end support illustrated in FIG. 5. As illustrated in FIG. 5, the distal end support 30 includes an end plate 35 arranged such that the front end of the frame 15 is closed by the end plate 35, As illustrated in FIG. 6, throughholes are provided in the end plate 35 at locations corresponding to the shafts 11, 12, respectively. In addition, tubular bodies 31, 32 are arranged in the throughholes, respectively.

As can be seen from FIG. 6, the inner diameters of the tubular bodies 31, 32 are sufficiently larger than the outer diameters of the shafts 11, 12 such that the shafts 11, 12 are inserted into the tubular bodies 31, 32, respectively. In addition, lengths of the tubular bodies 31, 32, which are defined along the axes of the tubular bodies 31, 32, are sufficiently large for supporting the shafts 11, 12, and typically larger than the thickness of the end plate 35. Furthermore, as illustrated in FIG. 6, the tubular bodies 31, 32 each reside for the most part in the frame 15. Accordingly, only one ends of the tubular bodies 31, 32 are recognizable from outside. With such construction and arrangement, the shafts 11, 12 are supported in and by the tubular bodies 31, 32, respectively, and allowed to be rotated therein. Instead of providing the tubular bodies 31, 32, the shafts 11, 12 may be directly inserted into the throughholes of the end plate 35, respectively.

In the first embodiment of the invention, the servo motor 19 and the holding units 13, 14 of the robot hand 10 are connected to each other via the shafts 11, 12. Thus, the servo motor 19 is spaced away from the holding units 13, 14 by the length of the shafts 11, 12. Accordingly, the servo motor 19 is not thermally affected even when the entry section 10a of the robot hand 10 enters, for example, the high-temperature area of the heating furnace 3. Thus, it is possible to stably handle the workpiece W even in the high-temperature area without causing malfunction of the servo motor 19.

Furthermore, in the first embodiment, the proximal end portions of the shafts 11, 12 are supported by the bearings 21, 22 of the proximal end support 20, respectively. In contrast, the distal end portions of the shafts 11, 12 are only inserted in the tubular bodies 31, 32 of the distal end support 30, or the support holes. In other words, it is possible to eliminate bearings, which may otherwise be provided near distal end portions of the shafts 11, 12. In the invention, there are no bearings near distal end portion of the shafts 11, 12. Accordingly, even when the distal end portions of the shafts 11, 12 enter the high-temperature area, it is possible to provide a solution to the problem found in the prior art, i.e., thermally-caused damage to the bearings near distal end portion of the shafts 11, 12.

In addition, since the servo motor 19 is used, the holding units 13, 14 can be readily positioned and allowed to take a desired posture. Accordingly, in the invention, it is also possible to quickly hold the workpiece W depending upon the size of the workpiece W and thereby reduce the time required for the operation in the high-temperature area.

Figure 7:
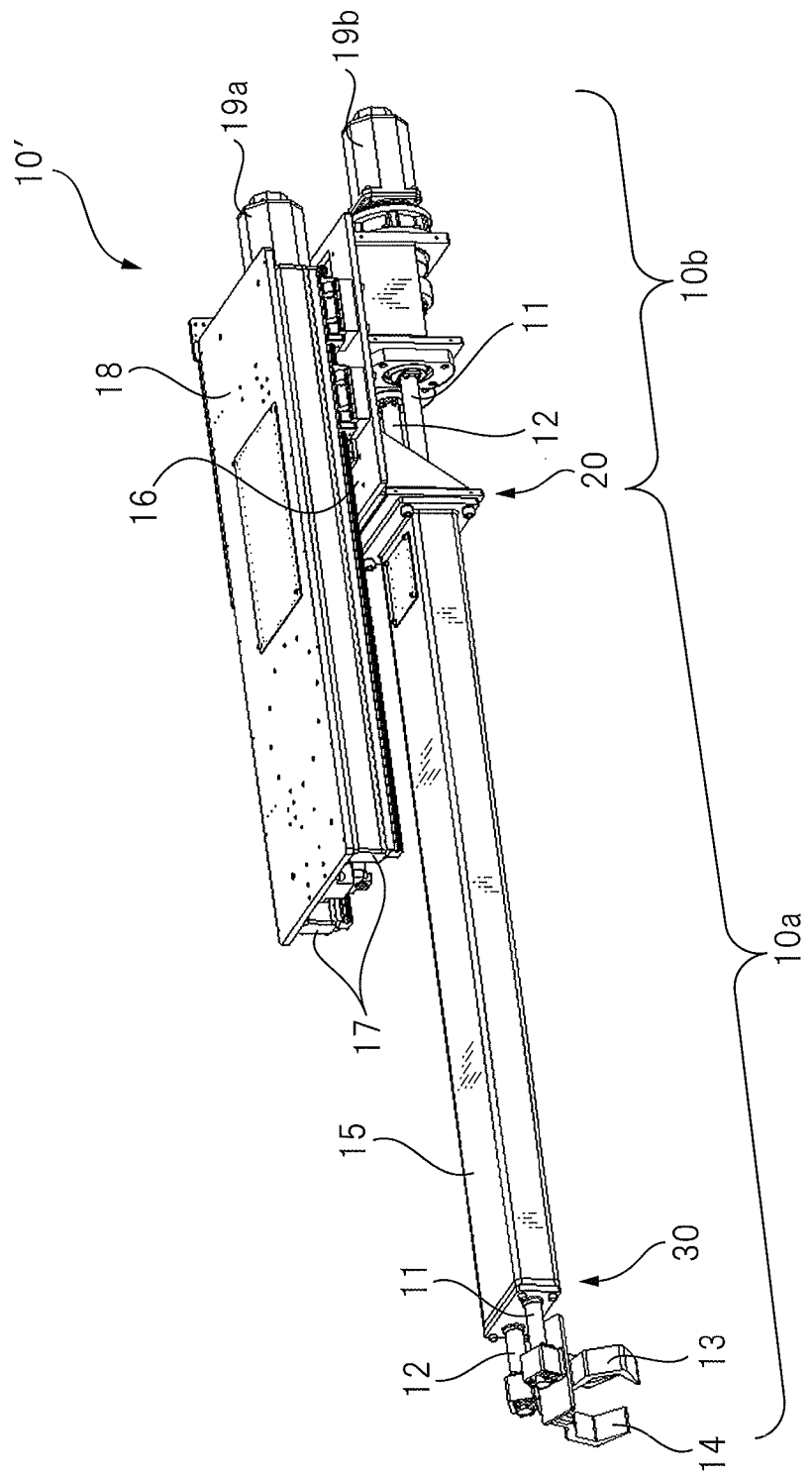
FIG. 7 is a perspective view of a robot hand according to a second embodiment of the invention.

FIG. 7 is a perspective view of a robot hand according to a second embodiment of the invention. As illustrated in FIG. 7, it is contemplated that the robot hand 10' is also connected via the upper surface of a base unit 18 to the front end of the robot arm 9. Furthermore, a first servo motor 19a is provided at one end of the base unit 18.

As illustrated in the figure, two linear-motion guide units 17 that are parallel to each other are provided on the lower surface of the base unit 18. The linear-motion guide units 17 extend in the longitudinal direction of the robot hand 10'. Furthermore, there is provided a slide unit 16 that is slidably engaged with the linear-motion guide units 17. By driving the first servo motor 19a, the slide unit 16 moves forward and backward along the linear-motion guide units 17.

As illustrated in FIG. 7, a second servo motor 19b is arranged at one end of the slide unit 16. There are provided a plurality of shafts that are parallel to each other, for example, two shafts 11, 12, whose proximal ends may be connected to the second servo motor 19b via a gear (not illustrated). These two shafts 11, 12 extend into a frame 15 through a proximal end support 20 provided at the other end of the slide unit 16. The frame 15 has the same or similar configuration as the one that has been described with reference to FIG. 2, explanation of which is therefore omitted.

In the same or similar manner as that described in the foregoing, the distal ends of the shafts 11, 12 extend through the distal end support 30 provided at the front end of the frame 15 and thus protrude from the frame 15. Furthermore, the holding units 13, 14 which are the same or similar elements as in the above example are provided at the distal ends of the shafts 11, 12, respectively. When the shafts 11, 12 are rotated by the second servo motor 19b in mutually opposite directions, the holding units 13, 14 rotate about the shafts 11, 12, so that the holding units 13, 14 are allowed to be opened and closed and thus the workpiece W is held and released by the holding units 13, 14. The proximal end support 20 and the distal end support 30 each have the same or similar configurations as in the above example.

As can be seen from FIG. 7, in the second embodiment, the holding units 13, 14, the frame 15, and the distal end support 30 constitute the entry section 10a. On the contrary, the base unit 18, the linear-motion guide unit 17, the slide unit 16, the first servo motor 19a, the second servo motor 19b, and the proximal end support 20 constitute the outside section 10b.

Similar effects as described in the above example can be obtained by the second embodiment of the invention. In addition, in the second embodiment, the slide unit 16 is allowed to be slided along the linear-motion guide unit 17 with reference to the base unit 18. Accordingly, the holding units 13, 14 can be moved further forward by the distance defined by the length of the base unit 18.

This configuration is particularly advantageous when the temperature in the high-temperature area such as the heating furnace 3 is considerably high. Accordingly, it is possible to further prevent the first servo motor 19a and the second servo motor 19b from being thermally affected. In addition, by virtue of the first servo motor 19a, it is possible for the entry section 10a of the robot hand 10' to enter the high-temperature area more quickly, and move backward out of the high-temperature area more quickly.

Figure 8:
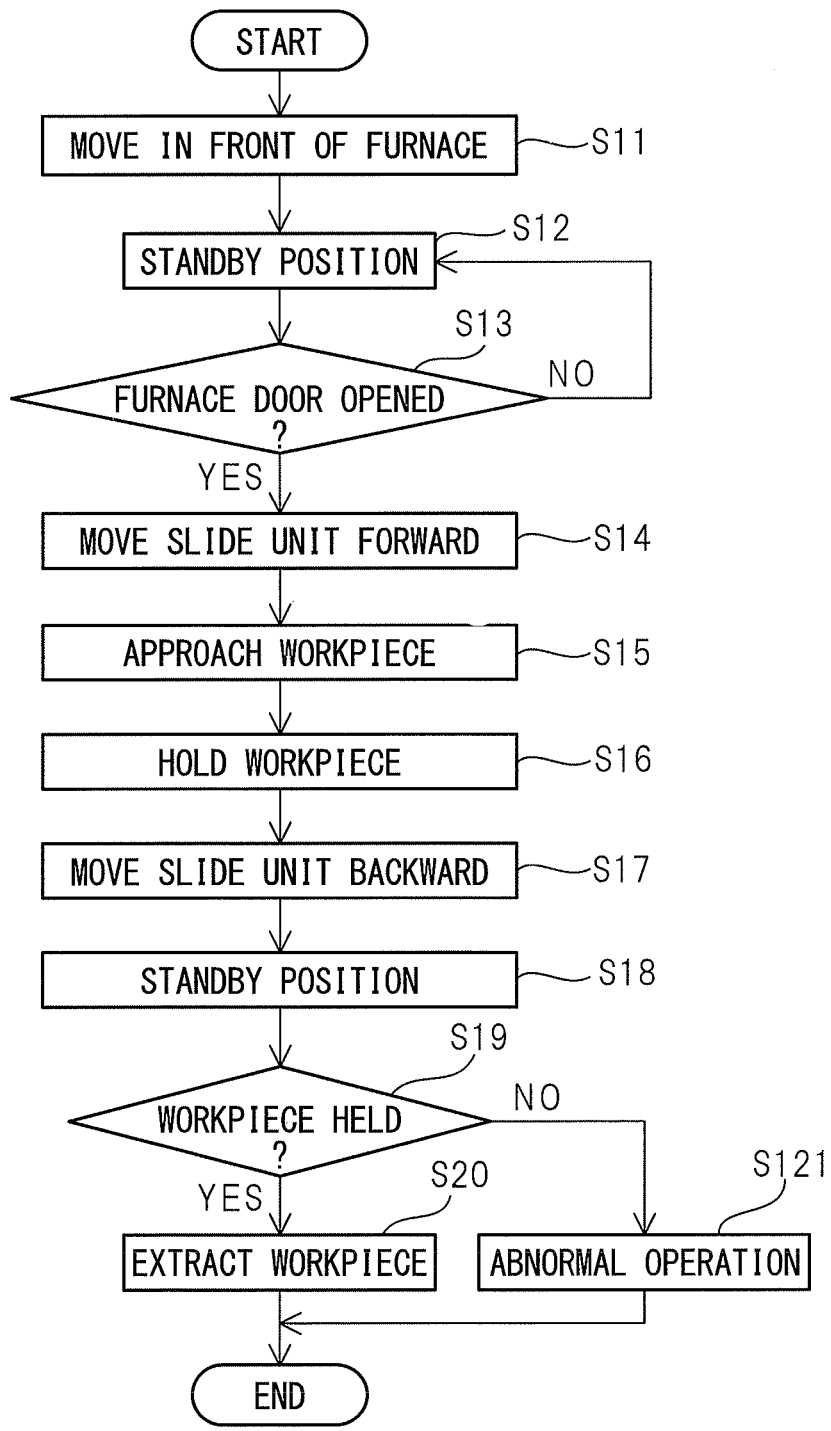
FIG. 8 is a flowchart illustrating the operation of a system that incorporates a robot comprising the robot hand according to the second embodiment of the invention.

FIG. 8 is a flowchart illustrating the operation of the system incorporating the robot comprising the robot hand according to the second embodiment of the invention. The following describes the operation of the system that includes the robot comprising the robot hand 10' with reference to FIGS. 1, 7, and 8. A program for performing the operation illustrated in FIG. 8 can also be stored in the controller 2 and executed by the controller 2.

In the step S11 of FIG. 8, the robot 4 is operated such that the robot hand 10' attached to the robot arm 9 is moved until it resides in front of the heating furnace 3. Furthermore, in the step S12, the robot hand 10' is placed at a predetermined standby position. After that, in the step S13, judgment is made as to whether or not a door of the heating furnace 3 is opened. When it is judged that the door is opened, the process proceeds to the step S14. When the door is not opened, the process proceeds back to the step S12 and the robot hand 10' is again placed in the standby state for a predefined time.

In the step S14, the first servo motor 19a is driven so that the slide unit 16 is moved toward the distal side along the linear-motion guide unit 17. The maximum moving distance of the slide unit 16 may be defined depending upon the lengths of the base unit 18 and the linear-motion guide unit 17. When the slide unit 16 is moved by a desired distance, the robot 4, in the step S15, makes the robot hand 10' approach the workpiece W. When the holding units 13, 14 of the robot hand 10' are sufficiently close to the workpiece W residing in the heating furnace 3, the process goes to the step S16.

In the step S16, the second servo motor 19b is driven such that the shafts 11, 12 are rotated in mutually opposite directions, thereby making the holding units 13, 14 hold the workpiece W in the heating furnace 3. After that, the first servo motor 19a is driven while the workpiece W remains to be held (by the holding units 13, 14), such that the slide unit 16 is moved toward the proximal side along the linear-motion guide unit 17 (step S17). After that, in the step S18, the robot hand 10' is again placed at the predetermined standby position.

After that, in the step S19, judgment is made as to whether or not the holding units 13, 14 are holding the workpiece W. This judgment is made by means of a sensor installed in advance in the robot hand 10' or the robot arm 9, for example, a weight sensor or a force sensor. When it is judged that the workpiece W is being held, then the process goes to the step S20 and extraction of the workpiece W is performed. In other words, the workpiece W is accommodated in the accommodation unit 8 illustrated in FIG. 1.

On the contrary, when it is judged that the workpiece W is not held, the process goes to the step S21. In this case, it is possible that the workpiece W is not held or any element other than the workpiece W is held. Accordingly, in the step S21, appropriate operation can to be performed depending upon the types of malfunction. Thus, it is possible to prevent any elements other than the workpiece W from being (inadvertently) accommodated in the accommodation unit 8 and thereby avoid unnecessary operation that the robot 4 may continue.

The servo motors 19a, 19b are configured to be controlled by the controller 4 of the robot. Accordingly, the operation of the robot hand 10' can be associated with the axis of the robot 4, which leads to reduction in time required for the operation. Furthermore, since there is no need for providing a specific control device for controlling the servo motors 19a, 19b for the robot hand 10', it is possible to offer the robot hand 10' inexpensively.

The operation of the robot hand 10' according to the second embodiment has been described with reference to FIG. 8. The robot hand 10 according to the first embodiment can largely operate in the same or similar manner as that illustrated in FIG. 8, except that the forward and backward movement of the slide unit 16 does not take place (which corresponds to the steps S14 and S17). Furthermore, the servo motors 19, 19a, 19b can also be protected in the same or similar manner even when the robot hands 10, 10' are used in any environment other than the high-temperature area, for example, an environment in which chemicals may splash.

EFFECTS OF INVENTION

In accordance with the first aspect, since the driving unit and the holding unit are connected to each other via the shafts, the driving unit can be spaced away from the holding unit by the lengths of the shafts. Furthermore, since the distal end portions of the shafts are only inserted in the support holes of the distal end support, it is possible to eliminate the bearing(s) which may otherwise be provided near distal end of the shafts. Accordingly, workpieces can be effectively handled by allowing the entry section of the robot hand to enter the high-temperature area without causing malfunction of the driving unit.

In accordance with the second aspect, since the second driving unit and the holding unit are connected to each other via the shafts, the second driving unit can be spaced away from the holding unit by the lengths of the shafts. Furthermore, since the distal end portions of the shafts are only inserted in the support holes of the distal end support, respectively, it is possible to eliminate the bearing(s) which may otherwise be provided near distal end portions of the shafts. As a result, the workpieces can be effectively handled by allowing the entry section of the robot hand to enter the high-temperature area without causing malfunction of the second driving unit. Furthermore, in the second aspect, the base unit that comprises the linear-motion guide unit is provided at the front end of the robot arm, and the holding unit is configured to be guided along with the slide unit along the linear-motion guide unit. As a result, the entry section of the robot hand is allowed to enter the high-temperature area more quickly and to be moved backward out of the high-temperature area more quickly.

In accordance with the third aspect, the holding unit can be readily positioned by the driving unit and allowed to take a desired posture. Accordingly, it is also possible to quickly hold the workpiece depending upon the size of the workpiece and thereby reduce the time required for the operation in the high-temperature area.

In accordance with the fourth aspect, the holding unit can be readily positioned by the second driving unit and allowed to take a desired posture. Accordingly, it is also possible to quickly hold the workpiece depending upon the size of the workpiece and thereby reduce the time required for the operation in the high-temperature area. Furthermore, by virtue of the first driving unit, the robot hand is allowed to enter the high-temperature area more quickly and to be moved backward out of the high-temperature area more quickly.

In accordance with the fifth aspect, the servo motor is driven by the control device of the robot. Accordingly, the operation of the robot hand is associated with the axis of the robot, which leads to reduction in time required for the operation. Furthermore, it is possible to eliminate the need for providing a specific control device that controls the servo motor for the robot hand, which further makes it possible to offer the robot hands inexpensively.

The invention has been described in accordance with the exemplary embodiments thereof. It will be appreciated by those skilled in the art that the aforementioned modifications, other various modifications, omissions, and additions may be made to the invention without departing from the scope of the invention.

The invention claimed is:

1. A robot hand comprising:
   (a) an outside section adapted for always remaining outside of a high-temperature area, the outside section including:
       (i) a base unit attached to a front end of a robot arm;
       (ii) a driving unit attached to the base unit; and
       (iii) a proximal end support adapted to support near proximal ends of a plurality of shafts connected to the driving unit, wherein the proximal end support is configured to support the shafts via a bearing; and
   (b) an entry section adapted for entering the high-temperature area, the entry section including:
       (i) a frame extending from the base unit and covering intermediate portions of the shafts;
       (ii) a distal end support provided in the frame and configured to support near distal end portions of the shafts, the distal end support including a plurality of support holes each larger than an outer diameter of each of the corresponding shafts such that the shafts are inserted into the support holes, respectively; and
       (iii) holding units each attached to each of the corresponding shafts and configured to hold a workpiece such that the workpiece is held by and released from the holding units by making the driving unit drive the shafts and thereby open and close the holding units.

2. The robot hand as set forth in claim 1, wherein the driving unit is a servo motor.

3. The robot hand as set forth in claim 2, wherein the servo motor is configured to be controlled by a controller of the robot.

4. A robot hand comprising:
   (a) an outside section adapted for always remaining outside of a high-temperature area, the outside section including:
       (i) a base unit attached to a front end of a robot arm;
       (ii) a linear-motion guide unit attached to the base unit (18);
       (iii) a slide unit attached to the linear-motion guide unit;
       (iv) a first driving unit configured to move the slide unit in a linear fashion along the linear-motion guide unit;
       (v) a second driving unit attached to the slide unit; and
       (vi) a proximal end support configured to support near proximal end portions of a plurality of shafts connected to the second driving unit, wherein the proximal end support is configured to support the shafts via a bearing; and (b) an entry section adapted for entering the high-temperature area, the entry section including:
(i) a frame extending from the base unit and covering intermediate portions of the shafts;
(ii) a distal end support provided in the frame and configured to support near distal end portions of the shafts, the distal end support including a plurality of support holes larger than an outer diameter of each of the corresponding shafts such that the shafts are inserted into the support holes, respectively; and
(iii) holding units each attached to each of the corresponding shafts and configured to hold a workpiece, the holding units being configured to be moved forward and backward by making the first driving unit move the slide unit along the linear-motion guide unit, and configured to be driven by the second driving unit and thereby opened and closed such that the workpiece is held by and released from the holding units.

5. The robot hand as set forth in claim 4, wherein the first driving unit and the second driving unit are a servo motor.

6. The robot hand as set forth in claim 5, wherein the servo motor is configured to be controlled by a controller of the robot.

\* \* \* \* \*